United States Patent
Lemay

[19]

[11] Patent Number: 6,098,087
[45] Date of Patent: *Aug. 1, 2000

[54] METHOD AND APPARATUS FOR PERFORMING SHIFT OPERATIONS ON PACKED DATA

[75] Inventor: Danielle G. Lemay, Sunnyvale, Calif.

[73] Assignee: Infineon Technologies North America Corp., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/065,759

[22] Filed: Apr. 23, 1998

[51] Int. Cl.$^7$ ............................................. G06F 5/01
[52] U.S. Cl. ................................. 708/209; 712/223
[58] Field of Search .......................... 708/209; 712/223

[56] References Cited

U.S. PATENT DOCUMENTS

| | | | |
|---|---|---|---|
| 4,194,241 | 3/1980 | Mager | 364/200 |
| 5,621,674 | 4/1997 | Gray et al. | 708/203 |
| 5,666,298 | 9/1997 | Peleg et al. | 708/209 |
| 5,673,427 | 9/1997 | Brown et al. | 395/595 |
| 5,675,526 | 10/1997 | Peleg et al. | 364/754 |
| 5,677,862 | 10/1997 | Peleg et al. | 364/754 |
| 5,729,482 | 3/1998 | Worrell | 708/209 |
| 5,818,739 | 10/1998 | Peleg et al. | 708/209 |
| 5,822,231 | 10/1998 | Wong et al. | 708/209 |

FOREIGN PATENT DOCUMENTS

| | | |
|---|---|---|
| 0 130 380 | 1/1995 | European Pat. Off. . |
| 0 743 593 A1 | 11/1996 | European Pat. Off. . |
| WO 96/17289 | 6/1996 | WIPO . |

Primary Examiner—David H. Malzahn

[57] ABSTRACT

An arrangement for shifting packed data is provided, in which packed data have multiple partial data each having n-byte, n being an integer greater or equal 1. The arrangement comprises: a shifter for shifting the packed data by a predetermined number of bits, a mask generator for generating a mask having multiple n-byte masks concatenated to the size of the packed data, and a logical unit for logically combining said mask with said shifted packed data to generate individually shifted partial data.

14 Claims, 7 Drawing Sheets

METHOD AND APPARATUS FOR PERFORMING SHIFT OPERATIONS ON PACKED DATA

BACKGROUND OF THE INVENTION

The present invention describes a method and apparatus for performing shift operations on packed data. Modern microcomputers and microcontrollers provide a data width of 32 bit, 64 bit or even more. In a lot of applications the processed data is still only 8 bit wide. Therefore, the above mentioned 32 bit- (or higher) microprocessors provide so called packed data instruction. These packed data instructions handle the content of a 32 bit- or a 64 bit-register differently depending on the data size. For example, if the data size indicates 8 bit packed data, a 32 bit word is split into 4 eight bit data parts, or a 64 bit word into 8 eight bit data parts which are usually processed independently by a processing unit. If the data size indicates 16 bit packed data, a 32 bit word is split into 2 sixteen bit data parts, etc. The processing unit usually comprises the respective number of independent units to process the respective parts of a packed word independently. The independent parts of the result of such a process are then stored, e.g. in another register, again as packed data.

U.S. Pat. No. 5,666,298 describes such an apparatus and the associated method for a shift instruction performed on packed data. FIG. 8 of U.S. Pat. No. 5,666,298 shows a plurality of independent working shift units to perform, e.g. up to eight shift operations independently on a 64 bit byte-packed data word. These plurality of units demand a certain amount of silicon space which in highly integrated devices not always is available.

SUMMARY OF THE INVENTION

It is therefore an object of the present invention to provide a method and an apparatus which requires less resources than the prior art.

This object is accomplished by an arrangement for shifting packed data having multiple bytes which form partial data having n-byte, whereby n is an integer greater than 1. The arrangement comprises a shifter for shifting said packed data by a predetermined number of bits, a mask generator for generating a multiple n-byte mask wherein each n-byte mask matches the shifted partial data, and a logical unit for logically combining said multiple n-byte mask with said shifted packed data to generate individually shifted partial data. The advantage of such an arrangement is, that a barrel shifter which is used for other objects in a microcontroller or microprocessor and therefore is already present, does not have to be redesigned or changed. Only a simple logic is necessary to accomplish the different tasks required by the different types of packed data shift instructions.

DESCRIPTION OF THE PREFERRED EMBODIMENT

The preferred embodiment is explained as a 32 bit microcontroller which is able to perform different shift operations on packed data. Thus, packed data are 32 bits wide and may contain 4 concatenated eight bit bytes, or 2 concatenated sixteen bit half-words, or 1 thirty-two bit word. The present invention is of course applicable for any kind of processor having any bit size, e.g. 64 bit, 128 bit or higher, or even on a 16 bit microprocessor. Throughout the following description byte is used for 8 bits, half-word is used for 16 bits, and word is used for 32 bits.

For performing a shift operation on packed data according to the present invention, a microcontroller usually comprises a decoder which receives respective control signals which cause execution of a specific packed data instruction. The control signals specifies, e.g. a specific register containing the packed data to be shifted, a destination register for storing the result of the respective operation, several data or sources containing the shift type, e.g. logical or arithmetical, the shift-amount and direction, e.g. left or right, and controls which specify the packed data type (byte, halfword, etc.). With a packed data instruction being decoded by the decoder the central processing unit of the microprocessor/microcontroller performs upon the signals decoded by the decoder the respective processing of the packed data. As the decoding and distribution of control and data signals is not part of the present invention and can be accomplished in many ways, the accompanying drawings only show the relevant parts of the respective execution unit of a 32 bit microcontroller.

Figure 1:
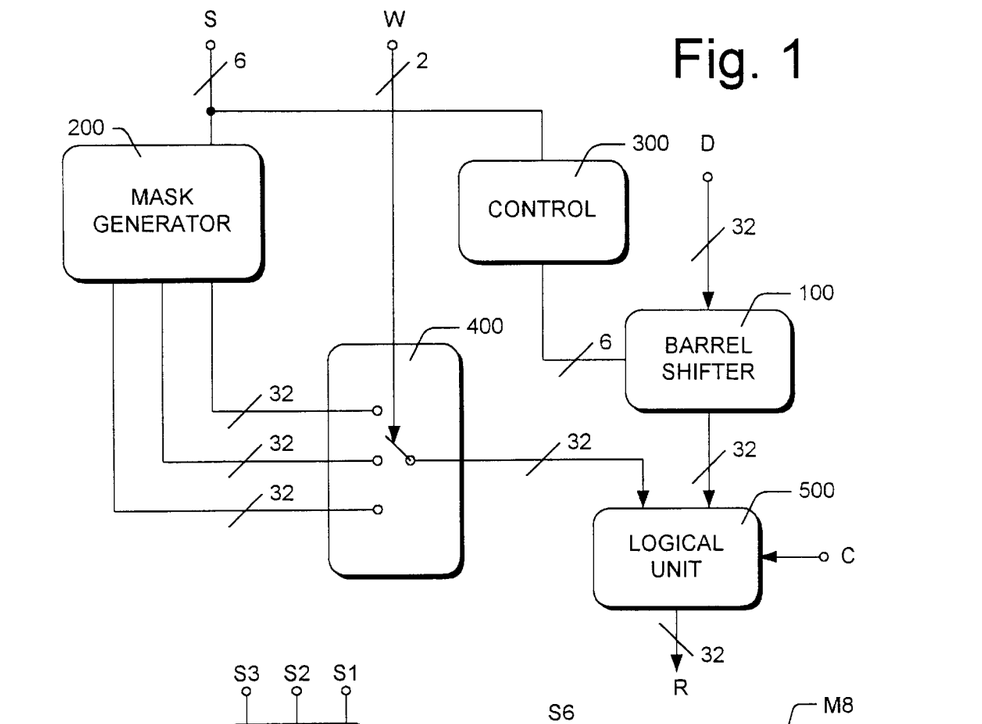
FIG. 1 is a block diagram showing the most relevant parts of the present invention.

FIG. 1 shows a barrel shifter 100 which forms the central part of the execution unit performing the packed data shift instruction. The barrel shifter 100 receives a 32-bit data input from terminal D and outputs a 32-bit data result. The barrel shifter shifts the data word by a number of positions to the left or to the right and wraps around the overflowing part. In another embodiment the barrel shifter can only shift to the left or to the right. Through the wrap around function a shift in the respective other function is established. The barrel shifter 100 is controlled by at least six control lines which are generated by a control unit 300. Control unit 300 receives, e.g. six control signals S1–S6 from a terminal S. Terminal S has six single terminals carrying control data determining the shift amount and the shift direction of the respective shift instruction. This size can be, for example, a byte, half-word, or word. A mask generator 200 is provided which is also connected to terminals S. Mask generator 200 generates three different 32-bit masks which are fed to a switch unit 400 which is controlled by terminal W. Terminal W consists, e.g. of two separate single terminals and carries a data indicating the size of the respective data presented on terminal D. Switch unit 400 selects one of the three 32-bit line sets and connects them to a logical unit 500 where the output of mask generator 200 is logically combined with the output of barrel shifter 100. Logical unit 500 can be controlled by a plurality of control lines coming from terminal C. Logical unit 500 outputs a 32-bit word as a result of the packed data instruction which is fed to terminal R.

To perform a packed data shift instruction, the decoder of the central processing unit decodes a respective packed data instruction thereby separating the different parameters used for the instruction. The decoder provides address pointers for the respective data registers which provide the execution unit shown in FIG. 1 with, e.g. a 32-bit data word fed to terminals D, a six bit shift amount and shift direction word indicating the shift value and direction which are fed to terminals S, and a two bit type data indicating the packed data type of the instruction fed to the terminals W. The mask generator generates a mask as shown in Table 1. The most significant bit S6 of input S indicates the shift direction and the lower five bits S5–S1, the shift amount. The respective three different 32-bit outputs are shown in Table 1.

TABLE I

| Input S | Word Mask | Half-Word Mask | Byte Mask |
|---------|-----------|----------------|-----------|
| 000000 | 111 . . . 11 | 111 . . . 11 | 111 . . . 11 |
| 000001 | 111 . . . 10 | 111 . . . 101 . . . 10 | 111 . . . 101 . . . 101 . . . 101 . . . 10 |
| 000010 | 111 . . . 100 | 111 . . . 1001 . . . 100 | 11 . . . 1001 . . . 1001 . . . 1001 . . . 100 |
| . | . | . | . |
| . | . | . | . |
| . | . | . | . |
| 100000 | 111 . . . 11 | 111 . . . 11 | 111 . . . 11 |
| 100001 | 000 . . . 01 | 000 . . . 010 . . . 01 | 000 . . . 010 . . . 010 . . . 010 . . . 01 |
| 100010 | 000 . . . 011 | 000 . . . 0110 . . . 011 | 00 . . . 0110 . . . 0110 . . . 0110 . . . 011 |
| . | . | . | . |
| . | . | . | . |
| . | . | . | . |
| 111111 | 011 . . . 11 | 011 . . . 11101 . . . 111 | 01 . . . 101 . . . 101 . . . 101 . . . 11 |

A left-shift is indicated by the most significant bit S6 of input S and the shift amount indicated by the lower five bits S5–S1 of input S determines the respective mask words. For example, line 3 of Table 1 indicates a left shift by the amount of two bit positions. Therefore, the word output would generate a mask consisting of 11111111111111111111111111111100. The half word output generates an output word consisting of 1111111111111100 1111111111111100. Finally, the byte output would generate a data mask consisting of 11111100 11111100 11111100 11111100. Barrel shifter 100 shifts the incoming data word by the amount indicated by the data fed to terminals S. The output of barrel shifter 100 is then logically combined with the output of the selected mask generator output. The following example shows how the execution unit works while performing a logical shift on a byte packed data word. It is assumed that the data word at terminals D carry a data word represented by "11110110011110011011111011101101". The six bits at terminals S are, for example 000100. Therefore, a left shift by four positions should be performed. The barrel shifter shifts the whole 32-bit word by four, thereby outputting the data word "01100111001101111011101011011111". The mask generator 200 generates three different 32-bit mask words. It is assumed that through control signal W, the packed data are indicated as of the byte type. The selected mask word therefore would be "11110000 11110000 11110000 11110000". The logical unit combines these two 32-bit words, for example, a logical AND operation is performed. The result of the operation presented at terminals R would therefore be "01100000 10010000 11100000 11010000". The result of this operation is equal to an independent logical shift operation on each 8 bits of the four concatenated bytes in the byte packed 32-bit word.

Figure 2:
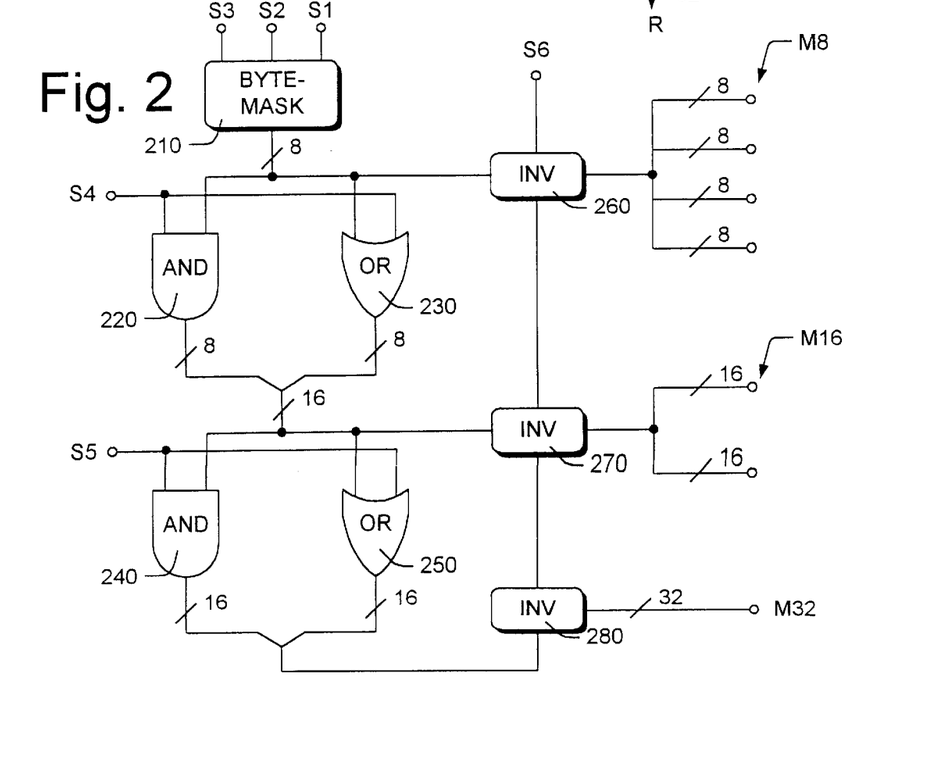
FIG. 2 is a block diagram showing an embodiment of the mask generator according to FIG. 1.

FIG. 2 shows an embodiment of the mask generator 200. A byte mask generator 210 is provided which is connected to three terminals S1, S2 and S3 which are the least significant three bits of control word S. Byte mask generator 210 generates an output according to Table 2.

TABLE 2

| S3 | S2 | S1 | Output |
|----|----|----|--------|
| 0 | 0 | 0 | 00000000 |
| 0 | 0 | 1 | 00000001 |
| 0 | 1 | 0 | 00000011 |
| 0 | 1 | 1 | 00000111 |
| 1 | 0 | 0 | 00001111 |
| 1 | 0 | 1 | 00011111 |

TABLE 2-continued

| S3 | S2 | S1 | Output |
|----|----|----|--------|
| 1 | 1 | 0 | 00111111 |
| 1 | 1 | 1 | 01111111 |

These 8 bits are fed to a controllable inverter unit 260. The output of inverter unit 260 is expanded 4 times to form four identical 8 bit lines which are concatenated to form a 32 bit mask. The 8 bit output of byte-mask generator 210 is also fed to a first AND unit 220 and to a first OR unit 230. AND unit 220 consists of eight AND gates and OR unit 230 consists of eight OR gates. The first inputs of each AND gate and of each OR gate is connected to one of the eight bit lines of byte mask generator 210. The other inputs of each AND gate and each OR gate in unit 220 and unit 230 are connected to terminal S4 of control word S. AND unit 220 therefore provides eight output signals and OR unit 230 provides another eight outputs which are concatenated to a 16-bit word which is fed to a controllable inverter unit 270. These 16-bit lines are also connected to a second AND unit 240 and a second OR unit 250. AND unit 240 consists of 16 AND gates. The first input of each AND gate in AND unit 240 is connected to one of the 16-bit lines, respectively. In the same manner, the first input of each OR gate in OR unit 250 is connected to one of the 16 input bit lines, respectively. The second inputs of each AND gate and of each OR gate of AND unit 240 and OR unit 250 is connected to terminal S5. AND unit 240 outputs 16 bits and OR unit 250 also outputs 16 bits which are concatenated to a 32-bit output word. This output word is also coupled with a controllable inverter 280. All three inverters, 260, 270 and 280 are controlled by the most significant bit S6 of control word S. The output of controllable inverter 260 is coupled with four sets of 8 bit lines forming a 32-bit word with four equal sets of mask bytes. This 32-bit packed mask word is indicated by numeral M8. The 16 output bits of inverter 270 are coupled with two sets of 16 bit lines which form a 32-bit packed word of half word type, whereby both sets of 16 bit lines carry the identical 16 bit mask. The resulting 32-bit mask word is indicated by numeral M16. Finally, the 32-bit output of inverter 280 are connected with the 32-bit lines forming a 32-bit mask word of the word type indicated by numeral M32.

The three inverters 260, 270 and 280 are controlled by the most significant bit S6 of control word S. If S6 is set to 0, then the respective 8 bits, 16 bits or 32 bits at the input of inverter 260, 270 or 280 are inverted and if S6 is set to 1, then all three inverters are bypassed. Thus, the respective mask according to Table 1 is generated. The output of the byte mask generator 210 according to Table 2 is extended to a 16 bit output by AND unit 220 and OR unit 230. If S4 is 0, then the upper 8 bits of the generated 16 bit mask word are automatically set to 0 by the AND unit 220. OR unit 220 passes then simply the generated 8 bit mask through which forms the lower 8 bit part of the 16 bit mask. If S4 is set to 1, then automatically OR unit 230 sets all lower 8 bits to 1 and AND unit 220 effectively passes through the 8 bit mask generated by byte mask generator 210 to the upper 8 bits of the 16 bit mask. In the same manner, bit S5 generates a 32 bit mask out of a 16 bit mask by means of an AND unit 240 and OR unit 250.

Figure 3:
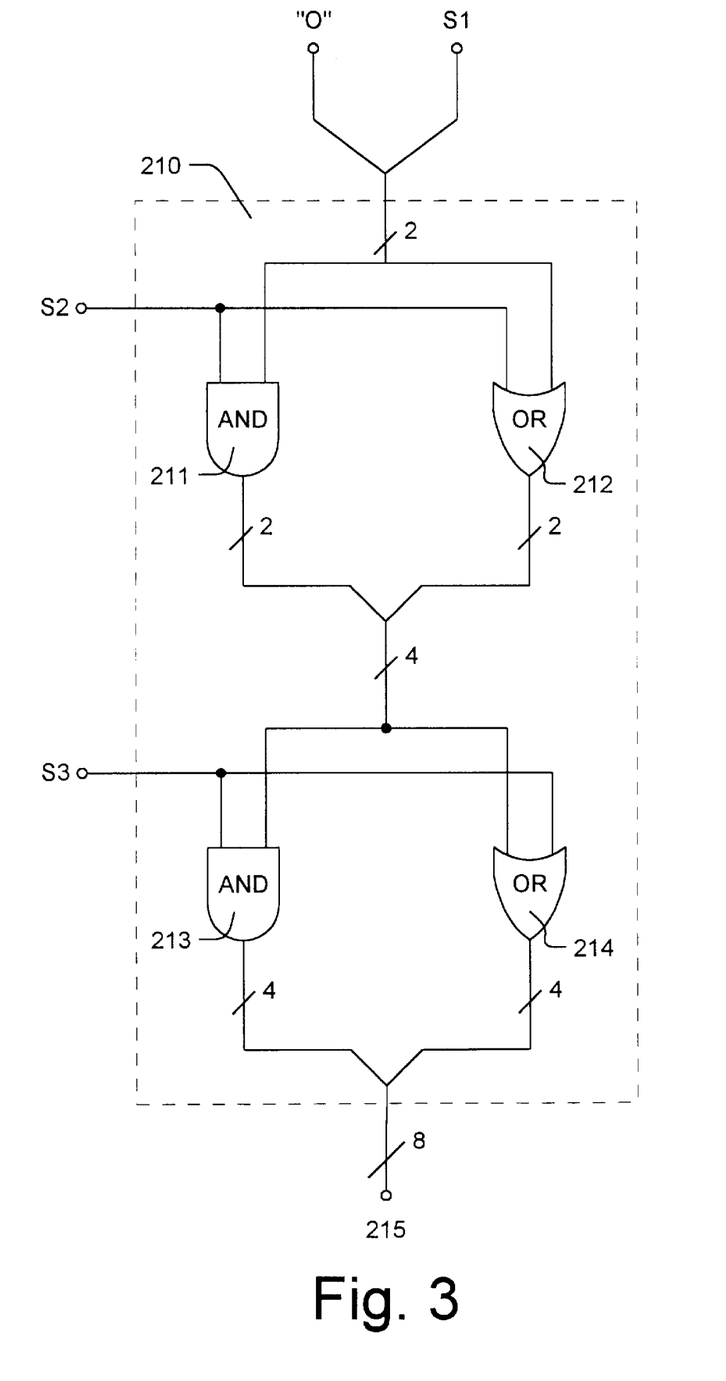
FIG. 3 is an embodiment of a byte mask generator according to FIG. 2.

FIG. 3 shows an embodiment of a byte mask generator 210 according to FIG. 2. The signal on terminal S1 is combined with a "0" thereby forming a two bit signal which is fed to an AND unit 211 and an OR unit 212. AND unit 211 consists of two separate AND gates, each having two inputs and one output. The first inputs of the AND gates in AND unit 211 are connected to one of the combined two bit signals, respectively and the second input of each AND gate of AND unit 211 is connected to terminal S2. In the same manner, the first inputs of each OR gate in OR unit 212 are connected to one of the two bit signals, respectively and the second input of each OR gate of OR unit 212 is coupled with terminal S2. The two output signals of the AND unit 211 and the OR unit 212 are combined to a four bit signal which is fed to an AND unit 213 and an OR unit 214. AND unit 213 consists of four AND gates each having two inputs and one output and OR unit 214 consists of four OR gates each having two inputs and one output. The first input of each AND gate in AND unit 213 is coupled with one of the four bit lines, respectively. The other input of each AND gate of AND unit 213 is connected to terminal S3. In the same manner, the first input of each OR gate in OR unit 214 is coupled with one of the four bit lines, respectively. The other input of each OR gate of OR unit 214 is connected to terminal S3. The four outputs of AND unit 213 and of OR unit 214 are combined to an 8 bit signal forming the output 215 of the byte mask generator 210.

AND unit 211 and OR unit 212 function as an expanding unit similar to AND unit 220 and OR unit 230 of FIG. 2. The two bits at the input of mask generator 210 basically form either the input signal "00" or "01". Through terminal S2 and AND unit 211 as well as OR unit 212, these two different input signals are expanded to four different outputs, each consisting of four bits. In the same manner, AND unit 213 and OR unit 214 in combination with terminal S3 generate an 8 bit output word according to Table 2.

Figure 4:
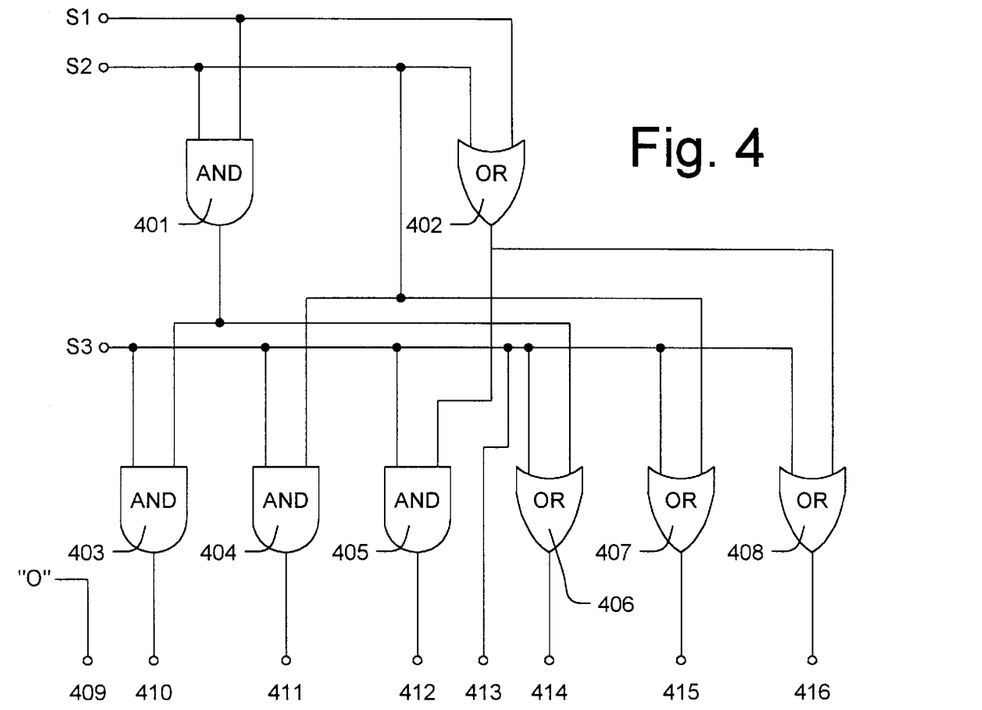
FIG. 4 is a further embodiment of a byte mask generator according to FIG. 2.

FIG. 4 shows another embodiment of a byte mask generator 210 according to FIG. 2. Terminal S1 is connected to the first input of an AND gate 401 and an OR gate 402. The second inputs of AND gate 401 and OR gate 402 are coupled with terminal S2. Further, S2 is coupled with the first inputs of an AND gate 404 and an OR gate 407. The output of AND gate 401 is coupled to first inputs of an AND gate 403 and an OR gate 406. The output of OR gate 402 is connected with the first inputs of an AND gate 405 and an OR gate 408. Terminal S3 is coupled with each second input of AND gate 403, 404 and 405 as well as with each second input of OR gate 406, 407 and 408. The generated byte mask is accessible at terminals 409–416. Terminal 416 is coupled with the output of OR gate 408, terminal 415 is coupled with output 407, terminal 414 is coupled with output of OR 406. Terminal 413 is coupled with terminal S3. Terminals 412, 411 and 410 are each coupled with outputs of AND gate 405, AND gate 404 and AND gate 403, respectively. Finally, terminal 409 is coupled to a fixed signal carrying a 0.

Figure 5:
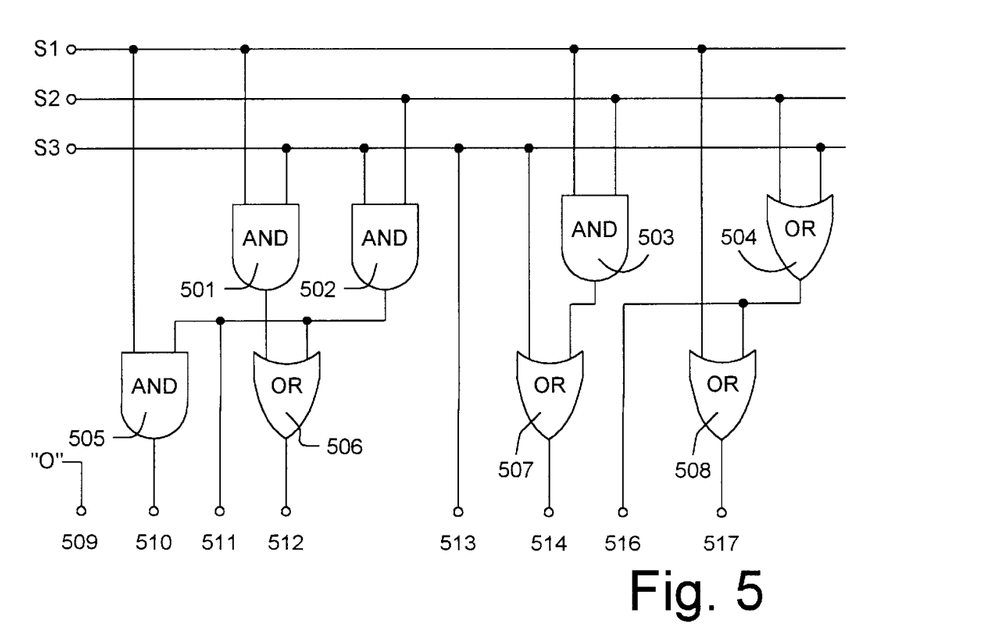
FIG. 5 is still a further embodiment of a byte mask generator according to FIG. 2.

FIG. 5 shows another embodiment of a byte mask generator 210 according to FIG. 2. Terminal S1 is coupled to first inputs of an AND gate 505, an AND gate 501, and AND gate 503, and an OR gate 508. Terminal S2 is coupled with a first input of an AND gate 502, a second input of AND gate 503, and a first input of OR gate 504. Terminal S3 is coupled with the second input of AND gate 501, the second input of AND gate 502, a terminal 513, the first input of an OR gate 507, and the second input of OR gate 504. The output of AND gate 501 is coupled with the first input of OR gate 506. The output of AND gate 502 is connected to the second input of OR gate 506, terminal 511 and the second input of AND gate 505. The output of AND gate 503 is connected to the second input of OR gate 507. The output of OR gate 504 is coupled with the second input of OR gate 508 and with terminal 516. The output of OR gate 508 is coupled with terminal 517, output of OR gate 507 is coupled with terminal 514, output of OR gate 506 is coupled with terminal 512 and output of AND gate 505 is connected to terminal 510. Finally, terminal 509 is provided which is connected to a fixed 0 signal. The byte mask is accessible at terminals 509 to terminal 517.

Figure 6:
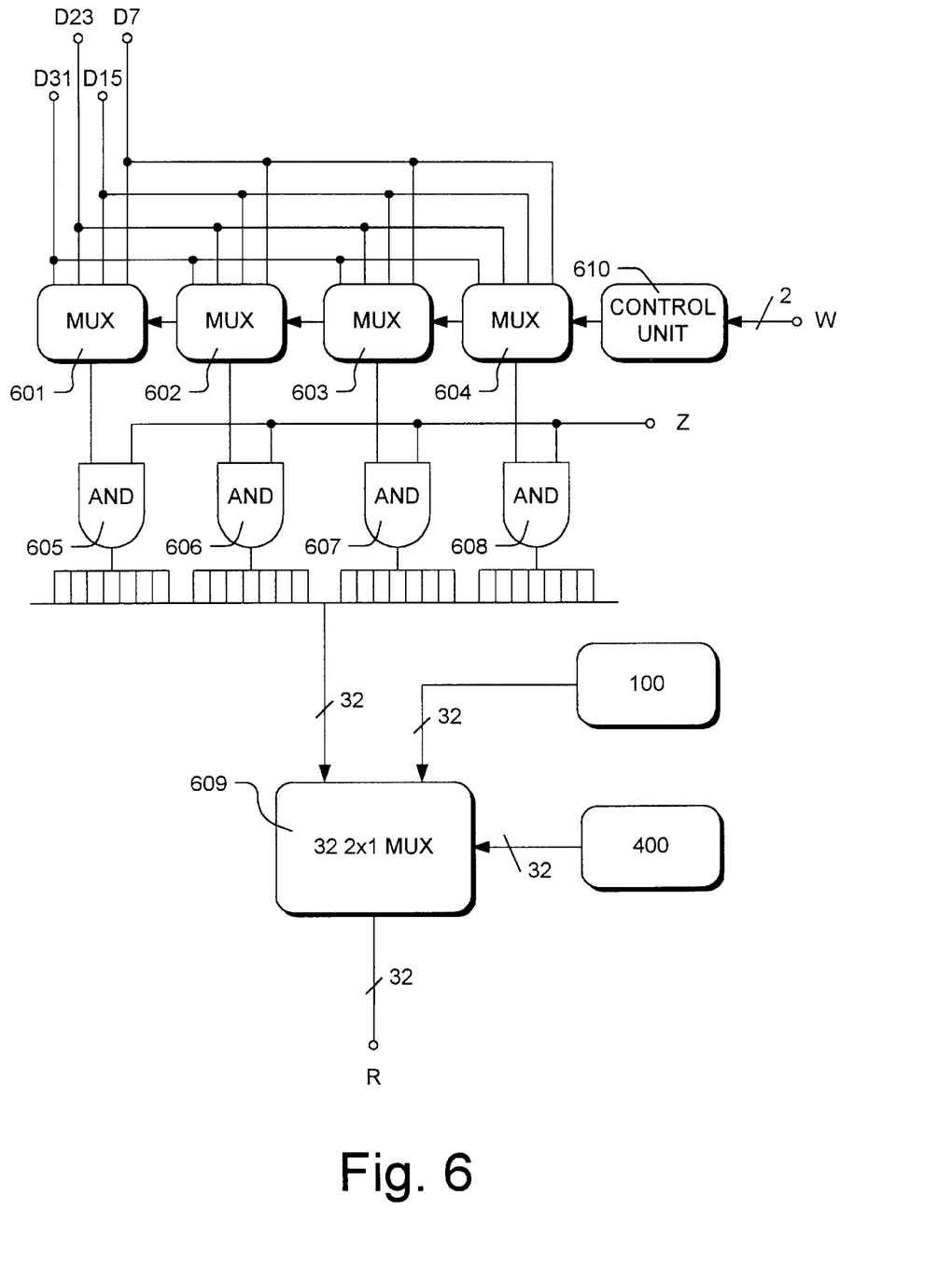
FIG. 6 is an embodiment of the logical unit according to FIG. 1, FIGS. 7–9 show schematic flow charts of three different instructions performed by an embodiment according to FIG. 1 in combination with FIG. 6.

FIG. 6 shows an embodiment of logical unit 500 according to FIG. 1. This embodiment uses as control signals C according to FIG. 1 four bit signals extracted of the data word D consisting of bit lines D31-D0, wherein these four bit signals are the bit lines D31, D23, D15 and D7. These four bit signals are the most significant bits of a word (D31), the two half words (D31, DI5) and the four bytes (D31, D23, D15 and D7). These four bit signals form a set which is fed to four inputs of four 4×1 multiplexers 601, 602, 603 and 604. All four multiplexers 601, 602, 603 and 604 are controlled by a control unit 610 which is connected to the two bit lines of control signal W. Each multiplexer 601, 602, 603 and 604 selects, according to the control signal W, one of the four input signals D31, D23, D15 or D7. Each output signal of the multiplexer 601, 602, 603 and 604 is fed to the first input of an AND gate 605, 606, 607 and 608, respectively. The second inputs of AND gate 605, 606, 607 and 608 are coupled with a terminal Z which carries a signal indicating whether a zero-filled (logical) or sign-extended (arithmetic) instruction is used, as will be described later. The outputs of AND gate 605, 606, 607 and 608 are each expanded to 8 bits and concatenated to a 32 bit word which is fed to a multiplexer unit 609. With other words, each line in a set of 8 bit lines carries the same signal and there are four different sets concatenated to a word. Multiplexer unit 609 contains 32 2×1 multiplexers. The first input of each multiplexer in multiplexer unit 609 is coupled with one of the 32 bit lines of the expanded output of the four AND gates 605, 606, 607, and 608, respectively. The second input of each multiplexer in multiplexer unit 609 is coupled with one of the 32 bit lines of the output of barrel shifter 100, respectively. The 32 control lines controlling each 2×1 multiplexer in multiplexer unit 609 are coupled with the output of switch unit 400. The output of multiplexer unit 609 is coupled with terminal R.

Each 2×1 multiplexer in multiplexer 609 is controlled by one of the 32 bit lines of switch unit 400 and selects either one of the 32 bit lines of the output of barrel shifter 100 or one of the 32 bit lines of the output of AND gates 605–608.

This embodiment allows a plurality of different packed data shift instructions to perform. Control signals W select which type of packed data are used, for example, byte, half word, or word. Signal control bit Z, which is also generated by the decoder unit (not shown), determines whether a zero-filled or sign extended instruction is performed. In combination with the shift direction indicated by terminal S6 of control data S, four different types of shift instructions can be performed. A zero-filled right shift instruction is also known as a logical right shift. A sign-extended right shift on the other hand is known as an arithmetic right shift instruction. Furthermore, zero-filled or sign-extended left shift instructions can be performed. Wherever the generated mask of mask generator 400 is 1, the respective 2×1 multiplexer in multiplexer unit 609 selects the output of barrel shifter 100. Wherever a bit line of the output of switch unit 400 is zero, the respective multiplexer of multiplexer unit 609 selects the bit line of the expanded outputs of AND gates 605–608. Control unit 610 controls the multiplexers 601–604 in a way that multiplexers 601–604 selects D31 as an output signal for each multiplexer if a word type is selected. Further, multiplexers 601 and 602 select bit line D31 and multiplexers 603 and 604 select bit line D15 if a half word type is selected. Finally, if a byte type is selected through control word W, control unit 610 controls multiplexer 601 to select bit line D31, multiplexer 602 to select bit line D23, multiplexer 603 to select bit line D15 and multiplexer 604 to select bit line D7, as an output signal. These output signals are combined through logical unit 605–608 with the sign/zero control signal Z. Therefore, each byte of the extended 32 bit output of AND gate 605–608 can be set to 0 or 1 according to the most significant bit of each byte, half word, or word of the input data D.

Figure 7:
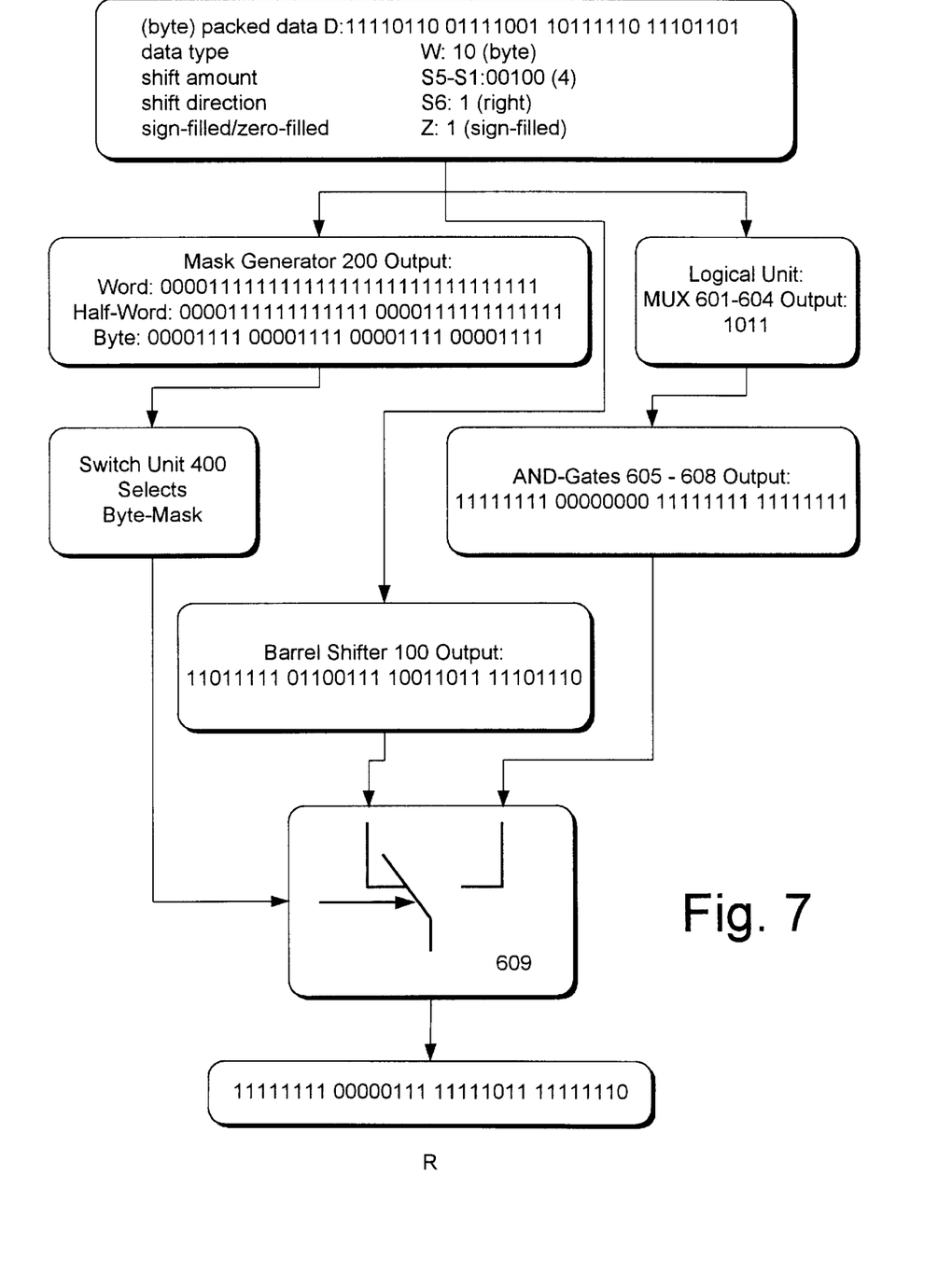
Figure 8:
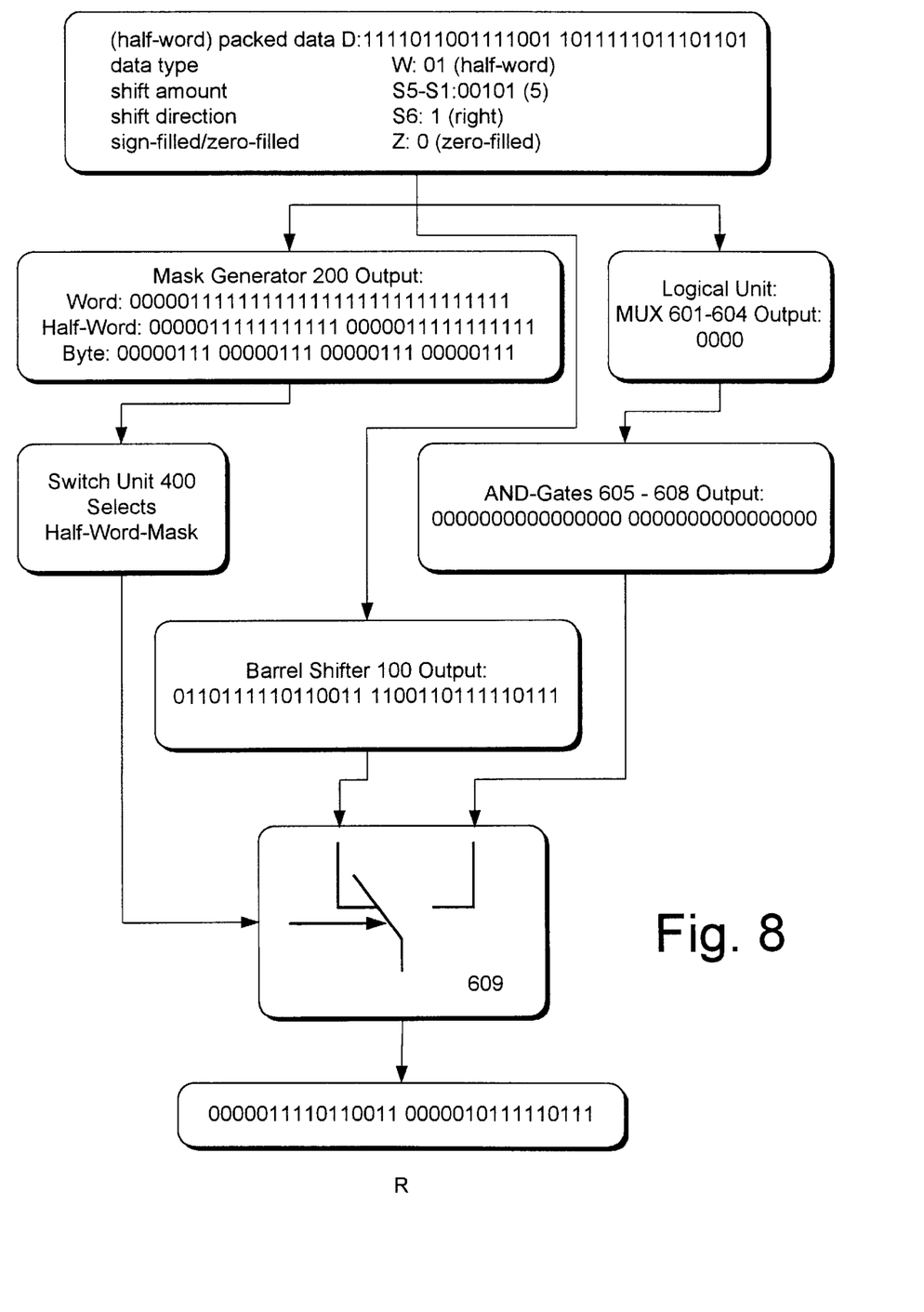
Figure 9:
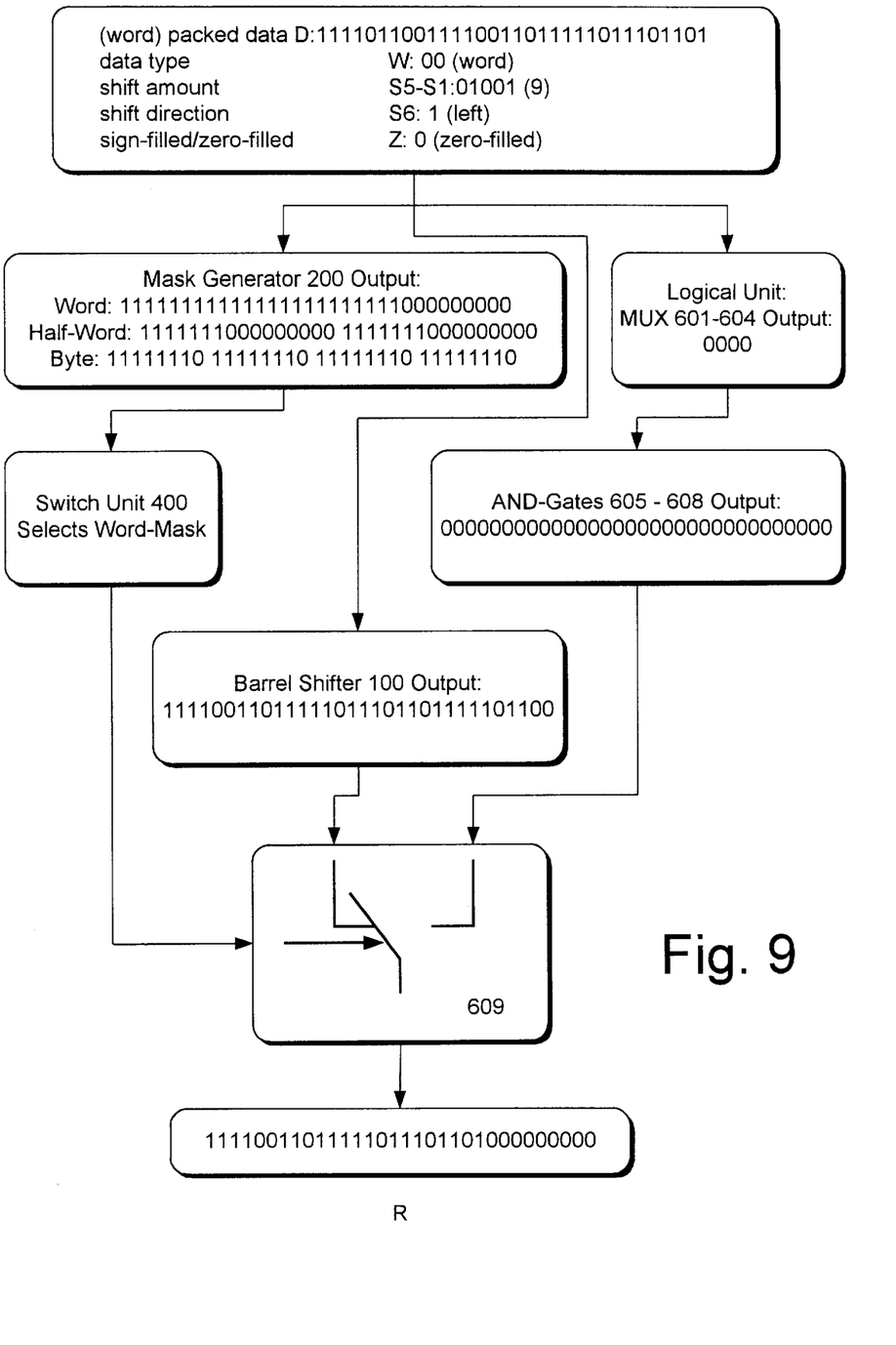

FIGS. 7 to 9 show four different type of packed data shift instructions by means of a schematic flow chart. In FIG. 7 a packed data shift instruction is decoded as a sign-filled right shift by 4 performed on 4 bytes concatenated to a 32 bit word D. In FIG. 8 a packed data shift instruction is decoded as a zero-filled right shift by 5 performed on 2 half-words concatenated to a 32 bit word D. Finally, in FIG. 9 a packed data shift instruction is decoded as a zero-filled left shift by 9 performed on a 32 bit word D.

The principle of the present invention can be realized in many different ways. For example, the principle of the present invention can be used with any type of processor and it can be easily expanded to 64 bit-processors, 128 bit-processors, etc. The inverter units 260, 270, and 280 can be incorporated in the multiplexer unit 609 by controlling the switches according to the control bit S6. If only a logical shift instruction is to be performed, the logical unit 500 can be simply formed by 32 AND gates. Other realizations of the logical unit are possible and will be apparent to someone skilled in the art.

What is claimed is:

1. Arrangement for shifting packed data, said packed data having multiple partial data each having n-byte, n being an integer greater or equal 1, comprising:

a shifter for shifting said packed data by a predetermined number of bits, a mask generator for generating a mask having multiple n-byte masks concatenated to the size of said packed data, a logical unit for logically combining said mask with said shifted packed data to generate individually shifted partial data.

2. Arrangement according to claim 1, wherein said mask generator comprises a n-byte mask generator generating a n-byte mask upon the least significant bits of a control signal and at least one expander which expands said byte mask to a 2n-byte mask, whereby n being an integer number greater or equal 1.

3. Arrangement according to claim 2, wherein said expander comprises a logical AND-unit and a logical OR-unit, whereby said logical AND-unit ANDs each bit of said n-byte mask with a further bit of said control signal and said logical OR-unit ORs each bit of said mask with said further bit of said control signal and the outputs of said logical units are combined to a 2n-mask word.

4. Arrangement according to claim 3, wherein said mask generator comprises a plurality of expanders coupled in series, whereby each expander outputs a mask having twice the bit width of the previous expander.

5. Arrangement according to claim 1, wherein said mask generator comprises a byte mask generator generating a byte mask upon the least significant bits of a control signal and an expander which expand said byte mask to a word-mask.

6. Arrangement according to claim 5, wherein said expander comprises a logical AND-unit and a logical OR-unit, whereby said logical AND-unit ANDs each bit of said mask with a further bit of said control signal and said logical OR-unit ORs each bit of said mask with a said further bit of said control signal and the outputs of said logical units are combined to a word-mask word.

7. Arrangement according to claim 5, wherein said byte mask generator is controlled by at least three bit lines and comprises four AND gates and four OR gates each having two inputs and one output, whereby the inputs of the first AND gate and the first OR gate are connected to the first and second bit line, respectively, the third bit line is connected to the first input of each of the third through fourth AND gates and OR gates, the output of the first AND gate is connected to the second input of the second AND gate and of the second OR gate, the second bit line is connected to the second input of the third AND gate and of the third OR gate the output of the first OR gate is connected to the second input of the fourth AND gate and of the fourth OR gate, the output of the fourth, third, second OR gate form the first three bits of the mask, the third bit line forms the fourth bit of the mask and the outputs of the fourth, the third, and the second AND gate form the fifth through seventh bit of the mask.

8. Arrangement according to claim 5, wherein said byte mask generator is controlled by at least three bit lines and comprises four AND gates and four OR gates each having two inputs and one output, whereby the first inputs of the first, second and fourth AND gate and of the third OR gate are connected to the first bit line, the second inputs of the third and fourth AND gate and the first input of the fourth OR gate are connected to the second bit line, the second inputs of the second AND gate and the fourth OR gate and the first inputs of the third AND gate and of the second OR gate are connected to the third bit line, the output of the fourth OR gate is connected to the second input of the third OR gate, the output of the fourth AND gate is connected with the second input of the second OR gate, the output of the third AND gate is connected to the second input of the first OR gate and with the second input of the first AND gate, the output of the third, the fourth and the second OR gate form the first three bits of the mask, the third bit line forms the fourth bit of the mask and the outputs of the first OR gate, the third, and the first AND gate form the fifth through seventh bit of the mask.

9. Arrangement according to claim 1 further comprising a select unit which selects the size of the packed data to be shifted.

10. Arrangement according to claim 9, wherein said select unit selects at least between a byte-size and a word-size and said mask generator generates at least a byte mask and a word mask.

11. Arrangement according to claim 1, wherein said logical unit comprises a multiplexer unit comprising a multiplexer for each byte of said packed data and selecting the most significant bit of one of said bytes according to a control signal, an AND unit comprising an AND gate having two inputs and one output for each byte of said packed data, whereby each AND gate combines the output of one of said multiplexers with a further control signal, the output of each AND gate is coupled with eight consecutive bit lines thereby forming a AND output data having the size of said packed data, a second multiplexer unit comprising a 2×1 multiplexer for each bit of said packed data, whereby the first input of each 2×1 multiplexer is connected to one of the output lines of said AND output data and the second input of each 2×1 multiplexer is connected to one of the output lines of said shifter and the control input of each 2×1 multiplexer is connected to one of the output lines of said mask generator.

12. Method of shifting packed data, said packed data having multiple partial data each having n-byte, n being an integer greater or equal 1, said shift operation performing a shift upon each partial data, said method comprising the steps of:

shifting the packed data by a shifter, generating a data mask having the size of said packed data whereby said data mask contains partial masks matching the shifted part of each partial data, logically combining said mask with said shifted packed data.

13. Method according to claim 12, whereby said data mask is controlled by the byte size of said packed data.

14. Method of shifting packed data, said packed data having multiple partial data each having n-byte, n being an integer greater or equal 1, said shift operation performing a shift upon each partial data, said method comprising the steps of:

shifting the packed data by a shifter, generating a data mask having the size of said packed data whereby said data mask contains partial masks matching the shifted part of each partial data, generating a sign/zero word having the size of said packed data, whereby each bit of a partial data of said sign/zero word consisting either of zeros or the sign of each partial data, selecting upon said data mask either the bit of the shifted packed data or of the sign/zero word.

* * * * *